United States Patent Office 2,948,664
Patented Aug. 9, 1960

2,948,664

METHOD OF MAKING CELLULAR POLYETHYLENE

Louis C. Rubens and Demetrius Urchick, Midland, Mich., assignors to The Dow Chemical Company, Midland, Mich., a corporation of Delaware No Drawing. Filed Oct. 18, 1956, Ser. No. 616,658

8 Claims. (Cl. 204—154)

This invention concerns a method of making cellular polyethylene articles. It relates more particularly to a method which involves treating pellicles of ethylene polymer with ionizing radiations and expanding the so-treated polymer by means of a normally gaseous foaming agent incorporated therein to form a cellular article composed of uniform small cells and possessing good resiliency and flexibility.

U.S. Patent No. 2,256,483 makes polyethylene foam by incorporating a gas in molten polyethylene under pressure and allowing the gas to expand the molten polymer by a reduction in pressure during an extrusion process, i.e. by extruding a froth of the molten ethylene polymer and a pore-forming gas under pressure into a zone of sufficiently lower pressure to cause expansion of the extruded material with resultant formation of a foam and cooling the foam to obtain a porous sponge-like product. U.S. Patent No. 2,387,730 makes cork-like products from ethylene polymer by placing the molten polymer under pressure of a gas soluble therein, i.e. by impregnating the molten polyethylene with a gas such as ethylene, methane, propane, butane, propylene, methyl chloride, etc., under pressure, followed by partial reduction in pressure sufficient to expand the polymer while maintaining the temperature and then cooling the polymer under the residual pressure and finally releasing the residual pressure.

The methods heretofore proposed for the manufacture of foamed ethylene polymer have not been entirely satisfactory. The expanded polymer which is formed upon sudden release of the pressure by an extrusion process on a blend of molten polyethylene and a gas has a tendency to shrink or collapse unless rapid and efficient cooling of the foam is effected to solidify the same. Foaming of the polyethylene by partial release of the pressure on a molten mass of the polymer containing a gas dissolved therein under pressure while maintaining the temperature, requires careful control of the temperature and pressure releasing conditions and cooling of the expanded polymer under the residual pressure in order to avoid the formation of a product composed of non-uniform or large cells.

It is a primary object of the invention to provide improvements in a process for making foamed or spongy articles from ethylene polymers. Another object is to provide a process which comprises treating pellicles of ethylene polymer with ionizing radiations and expanding the so-treated polymer by means of a normally gaseous foaming agent incorporated therein to form a cellular article composed of uniform small cells and possessing good resiliency and flexibility. A further object is to provide a method of treating molded articles prepared from ethylene polymer which inhibits or substantially prevents the tendency of the foamed polymer article to shrink or collapse when the molten polymer is expanded by means of a gas dissolved therein under pressure. Other and related objects may appear from the following description of the invention.

According to the invention the foregoing and related objects are obtained by subjecting pellicles of ethylene polymer to ionizing radiations in amount sufficient to cause the polymer to be insoluble in boiling decalin and insufficient to prevent appreciable flow of the polymer at temperatures above its crystalline melting point, e.g. at temperatures between 100° and 200 C., suitably ionizing radiations corresponding to a dosage of from about 2 to 20 mega-R.E.P.'s per square centimeter, depending in part upon the molecular weight of the polyethylene initially used, thereafter placing the so-treated polyethylene under pressure of a normally gaseous agent soluble therein at temperatures above the softening point of the polymer until the gaseous agent is uniformly or substantially uniformly dispersed throughout the irradiated material and suddenly releasing the pressure by an amount at least sufficient to cause the dissolved gaseous agent to expand the heated polymer with resultant formation of a cellular polyethylene body.

Ionizing radiation, as the term is well understood in the art, concerns the exposure of a material such as high polymers and especially ethylene polymers, i.e. normally solid polyethylene, to beta rays, gamma rays, X-rays, neutrons, accelerated electrons, etc. Convenient sources for such radiations may be furnished by atomic piles or particle accelerators, radio-active isotopes, e.g. cobalt 60, and X-ray equipment.

Any normally solid polymer of ethylene can be used in the process. The polymers melt or soften at temperatures between 100° and 200° C., depending in part upon the molecular weight which is preferably 4000 or greater. They correspond in composition substantially to $(CH_2)_x$ and show a crystalline structure when subjected to X-ray diffraction analysis and are linear or substantially linear polymers. The ethylene polymer may be in any form, e.g. in granules, beads or other particulate form or in the form of shaped articles such as a rod, bar, strip, film, sheet or molded articles of irregular configuration.

The ethylene polymer is subjected to ionizing radiation, e.g. electrons from a Van de Graaff accelerator, in amount sufficient to cause the polymer to be insoluble in boiling decalin and insufficient to prevent appreciable flow of the polymer at temperatures within the range of from 100° to 200° C. In general an amount of ionizing radiation corresponding to from about 2 to 20 mega-R.E.P.'s per square centimeter is satisfactory, but somewhat greater or lesser amounts of radiation can be used, depending in part upon the molecular weight of the polyethylene starting material.

The normally gaseous agents to be employed as foaming agents in the process are gases at ordinary temperatures and pressures. Examples of suitable normally gaseous agents are neopentane (tetramethylmethane), monochlorodifluoromethane, dichlorodifluoromethane and dichlorotetrafluoroethane or mixtures of any two or more of such normally gaseous agents. The normally gaseous agents are soluble or partially soluble in the ethylene polymer. They can readily be incorporated with the polymer by placing the molten polymer under pressure of the gaseous agent suitably at temperatures between about 100° and 225° C. and at pressures up to 5000 pounds, preferably from 200 to 800 pounds, per square inch gauge pressure.

In practice the irradiated polyethylene in the desired form such as granules, beads, strips, sheet, film, bars or rods is placed under pressure of a gaseous agent as herein defined and heated at temperatures above the melting point of the polymer until the latter contains the gaseous agent uniformly or substantially uniformly distributed throughout. Thereafter, the pressure is suddenly released, whereby the dissolved gaseous agent expands the molten polymer with resultant formation of a cellular product.

composed for the most part of uniform small cells.

It is important that the irradiated ethylene polymer containing the normally gaseous agent dissolved therein under pressure not be subjected to mechanical working such as occurs in an extrusion process, prior to release of the pressure and expanding of the polymer. The method is advantageously employed in the manufacture of cellular strip, sheet, film, bars or rods which are useful for a variety of purposes, e.g. as resilient sealing strips, gaskets, or in the preparation of laminated articles. Foamed granules of the polyethylene can be bonded together with a suitable adhesive or binder and pressed to form continuous sheets, strips or bars of resilient material.

The following examples illustrate ways in which the principle of the invention has been applied, but are not to be constructed as limiting its scope.

EXAMPLE 1

In each of a series of experiments, a charge of 70 grams of granular polyethylene having a melt index of 6.6 was subjected to irradiation with electrons from a Van de Graaff accelerator for a total dosage of $8 \times 10^6$ R.E.P. The irradiated polyethylene and a normally gaseous compound as identified in the following table were sealed in a stainless steel bomb, fitted with a frangible disc, and maintained at a temperature of 115° C. under the autogenous pressure of the materials for a period of 16 hours. Thereafter, the pressure was suddenly released by rupturing the frangible disc and allowing the granules of the polyethylene containing the normally gaseous compound impregnated therein to expand in the atmosphere. The granules of expanded polyethylene were collected and examined for cell structure and increase in volume compared to the volume of the particles of the non-foamed polyethylene particles initially used. All of the foamed polyethylene was in the form of discrete particles composed of uniform small cells. Table I identifies the experiments by naming the compound employed as foaming agent in making the cellular granules. The table also gives the total dose in R.E.P. of ionizing radiations to which the polyethylene particles was subjected prior to foaming the same and the volume of the foamed polyethylene particles compared to the volume of the non-foamed polyethylene starting material. For purpose of comparison, similar particles of polyethylene having a melt index of 6.6, which polyethylene was not subjected to ionizing radiation, was treated in similar manner and the results included in the table.

*Table I*

| Run No. | Starting Materials | | | | Product—foamed product volume/ initial polyethylene vol. |
|---|---|---|---|---|---|
| | Polyethylene, gms. | Ionizing Radiation, R.E.P. | Normally Gaseous Compound | Cc. | |
| 1 | 70 | None | Dichlorodifluoromethane. | 25 | Foam blew apart and collapsed. |
| 2 | 70 | $8 \times 10^6$ | ----do---- | 25 | 20. |
| 3 | 70 | $8 \times 10^6$ | ----do---- | 15 | } 18. |
| | | | Monochlorotrifluoroethane. | 10 | |
| 4 | 70 | $8 \times 10^6$ | Dichlorotetrafluoroethane. | 30 | } 23. |
| | | | Monochlorotrichloroethane. | 20 | |
| 5 | 70 | $8 \times 10^6$ | Dichlorotetrafluoroethane. | 40 | } 22. |
| | | | Monochlorotrifluoroethane. | 10 | |

EXAMPLE 2

In each of a series of experiments, polyethylene having a melt index of 2 and a number average molecular weight of about 20,000 was compression molded to form flat plates having the dimensions 6 x 6 inches by ⅛-inch thick. The molded sheet of the polyethylene was subjected to irradiation with electrons from a Van de Graaff accelerator for a total dosage per square centimeter as stated in the following table. Strips ½-inch wide by 6 inches long were cut from the irradiated sheet. Three such strips were placed in a nickel bomb having internal dimensions of ⅞-inch diameter by 18 inches deep and closed on one end by a frangible disc. The bomb was cooled to $-78°$ C. and a charge of 50 cc. of cold liquid symdichlorotetrafluoroethane was added. The bomb was sealed, allowed to warm to room temperature, then was heated at 120° C. for a period of about 10 hours. The pressure in the bomb was 320 pounds per square inch gauge pressure. Thereafter, nitrogen was fed to the bomb sufficient to increase the pressure and rupture the frangible disc, which disc broke at a pressure of 750 p.s.i. Upon release of the pressure, the polyethylene was blown from the bomb and was expanded in most isntances to form a cellular strip of substantially greater dimensions than the test piece initially used. Table II identifies the experiments by stating the dosage in mega-R.E.P.'s to which the test pieces of the polymer were subjected and gives the character of the foamed product. For purpose of comparison a test piece of molded non-irradiated polyethylene of similar melt index and dimensions was subjected to pressure with dichlorotetrafluoroethane and blown in similar manner and the result included in the table.

*Table II*

| Run No. | Starting Material | | Product | |
|---|---|---|---|---|
| | Polyethylene Strip Dimensions, inches | Ionizing Irradiation, R.E.P. | Foamed Product Dimensions, inches | Remarks |
| 1 | ½ x 6 x ⅛ | None | No continuity | Dense, slightly foamed pieces. |
| 2 | ½ x 6 x ⅛ | $2 \times 10^6$ | Irregular | Slightly foamed. |
| 3 | ½ x 6 x ⅛ | $4 \times 10^6$ | 2 x 24 x ¼ | Soft, flexible resilient fine cells. |
| 4 | ½ x 6 x ⅛ | $6 \times 10^6$ | 2 x 26 x ⅜ | Do. |
| 5 | ½ x 6 x ⅛ | $8 \times 10^6$ | 2 x 26 x ⅜ | Do. |
| 6 | ½ x 6 x ⅛ | $14 \times 10^6$ | 1½ x 26 x ⅜ | Do. |
| 7 | ½ x 6 x ⅛ | $20 \times 10^6$ | 1¼ x 20 x ⅜ | Do. |

EXAMPLE 3

A sheet 80 mils thick prepared from polyethylene having a number average molecular weight of about 21,000 was subject to irradiation with electrons from a Van de Graaff accelerator for a total dosage of $8 \times 10^6$ R.E.P. The irradiated polyethylene sheet swelled but was insoluble in boiling decalin. A test strip of the irradiated polyethylene 0.5 inch wide by 15 inches long was cut from the sheet. The test strip together with 25 cc. of cold liquid 1,2-dichlorotetrafluoroethane (Freon 114) was sealed in a Z-nickel metal bomb having internal dimensions of ⅞ inch diameter by 18 inches deep and fitted with a frangible metal disc. Total volume of the bomb was 170 cc. The bomb and its contents were heated at a temperature of 115° C. for a period of 10 hours. Thereafter, the frangible disc was ruptured and the impregnated polyethylene strip allowed to expand in the atmosphere. The polyethylene foamed to yield a cellular strip having the dimensions 1.5 inches wide by 0.25 inch thick by 45 inches long. The product was composed of uniform fine cells, had good resiliency and was very flexible.

EXAMPLE 4

A film 5 mils thick, prepared from polyethylene having a melt index of 6.6, was subjected to irradiation with electrons from a Van de Graaff accelerator for a total dosage of $10 \times 10^6$ R.E.P. The irradiated polyethylene film, together with 25 cc. of 1,2-dichlorotetrafluoroethane (Freon 114) was sealed in a ⅞ inch diameter by 18 inches long stainless steel bomb having a total capacity of 170 cc. The film and 1,2-dichlorotetrafluoroethane were heated at a temperature of 115° C. for a period of 16 hours. Thereafter, the pressure was suddenly released. The impregnated polyethylene film foamed to a cellular sheet composed of uniform small cells.

EXAMPLE 5

Ethylene polymer of average molecular weight between 25,000 and 28,000 and which polymer was soluble in decalin at a temperature of 170° C. was subjected to irradiation with electrons from a Van de Graaff accelerator for a total dosage of $6 \times 10^6$ R.E.P. The irradiated polyethylene was insoluble in decalin, but swelled to 16 times its initial volume in said solvent at a temperature of 170° C. A charge of 70 grams of the irradiated polyethylene and 20 grams of dichlorotetrafluoroethane was sealed in a bomb and heated at a temperature of 115° C. for a period of 4 hours under the autogenous pressure of the materials. Thereafter, a valve was opened and the pressure suddenly released, thereby allowing the mass to expand freely at atmospheric pressure. For purpose of comparison, ethylene polymer of similar molecular weight, but not subjected to ionizing radiations, was expanded by a similar procedure. The results were as follows:

| Irradiated Polyethylene | Non-irradiated Polyethylene |
| --- | --- |
| Small, individually-closed uniform cells, and good resiliency. Density 0.034 gm./cc. | Large, interconnected nonuniform cells, and poor resiliency. Density 0.04 gm./cc. |

EXAMPLE 6

Polyethylene having a melt index of 2 and in the form of solid particles having dimensions of ⅛-inch diameter by 3/16-inch long was subjected to irradiation with electrons from a Van de Graaff accelerator for a total dosage of $8 \times 10^6$ R.E.P. In each of a series of experiments, 5 cc. of the irradiated polyethylene granules, together with 4 cc. of a liquid normally gaseous agent as stated in the following table, were sealed in a glass ampoule and heated at a temperature of 120° C. for a period of 2 hours. Thereafter, the ampoules were removed from the heating chamber and immediately broken by dropping the same into a clean 2-inch diameter pipe well. The polyethylene was allowed to foam by expansion of the gaseous agent at atmospheric pressure. The foamed polyethylene was collected and examined for foamed volume compared to the initial volume of the polyethylene. Table III identifies the runs and names the normally gaseous agent employed as foaming agent. The table also gives the ratio of the volume of the foamed product compared to the initial volume of the polyethylene granules. For purpose of comparison, a portion of the irradiated polyethylene granules was sealed in a glass ampoule with isopentane and subjected to the same procedure. The results are also included in the table.

Table III

| Run No. | Starting Materials | | | | Product, initial polyethylene, volume |
| --- | --- | --- | --- | --- | --- |
| | Polyethylene Granules, cc. | Ionizing Radiation, R.E.P. | Foaming Agent | | |
| | | | Kind | Cc. | |
| 1 | 5 | $8 \times 10^6$ | Dichlorodifluoromethane | 4 | 31.4 |
| 2 | 5 | $8 \times 10^6$ | Dichlorotetrafluoroethane | 4 | 25.5 |
| 3 | 5 | $8 \times 10^6$ | Neopentane | 4 | 41.2 |
| 4 | 5 | $8 \times 10^6$ | Isopentane | 4 | 5.5 |

We claim:

1. In a process for making polyethylene foam whereby in a polymeric composition comprising essentially polyethylene having a normally gaseous agent intimately incorporated therewith under pressure at temperatures above the melting point of the polymer is expanded by suddenly reducing the pressure sufficiently to cause expansion of the composition with resultant formation of a foam, the steps which consist in subjecting polyethylene to an amount of ionizing radiation corresponding to a total dose of from 2 to 20 mega-R.E.P.'s sufficient to cause the polyethylene to be insoluble in boiling decalin and insufficient to prevent appreciable flow of the polyethylene at temperatures between 100° and 200° C., placing the irradiated polyethylene under pressure of a normally gaseous agent selected from the group consisting of tetramethylmethane, monochlorodifluoromethane, dichlorodifluoromethane and dichlorotetrafluoroethane, at temperatures above the crystalline melting point of the polyethylene and without mechanical working of the heat-plastified polymer and suddenly releasing the pressure.

2. A process for making cellular articles from ethylene polymer which comprises subjecting a pellicle of normally solid polyethylene to an amount of ionizing radiation corresponding to a total dose of from 2 to 20 mega-R.E.P.'s sufficient to cause the polyethylene to be insoluble in boiling decalin and insufficient to prevent appreciable flow of the polyethylene at temperatures between 100° and 200° C., placing the irradiated polyethylene under pressure of a normally gaseous agent selected from the group consisting of tetramethylmethane, monochlorodifluoromethane, dichlorodifluoromethane and dichlorotetrafluoroethane, at temperatures between 100° and 200° C. and above the crystalline melting point of the polyethylene and without mechanical working of the heat-plastified polymer and suddenly releasing the pressure.

3. A process as claimed in claim 2, wherein the pellicle of polyethylene is in the form of a sheet having a thickness between 0.05 and 0.25 inch and the normally gaseous agent is dichlorotetrafluoroethane.

4. A process as claimed in claim 3, wherein the polyethylene starting material is substantially linear and has a molecular weight of at least 4000.

5. A process as claimed in claim 2, wherein the normally gaseous agent is dichlorotetrafluoroethane.

6. A process as claimed in claim 2, wherein the normally gaseous agent is monochlorodifluoromethane.

7. A process as claimed in claim 2, wherein the normally gaseous agent is tetramethylmethane.

8. A process as claimed in claim 2, wherein the normally gaseous agent is dichlorodifluoromethane.

References Cited in the file of this patent

UNITED STATES PATENTS

| | | |
| --- | --- | --- |
| 2,387,730 | Alderson | Oct. 30, 1945 |
| 2,409,910 | Stober | Oct. 22, 1946 |
| 2,576,911 | Amos | Dec. 4, 1951 |
| 2,576,977 | Stober | Dec. 4, 1951 |

FOREIGN PATENTS

| | | |
| --- | --- | --- |
| 730,476 | Great Britain | May 25, 1955 |
| 64,192 | France | May 18, 1955 |
| | (2d addition to No. 1,079,401) | |

OTHER REFERENCES

"I. and E. Chem.," vol. 45, September 1953, pp. 13A, 15A.

Charlesby: "Nucleonics," vol. 12, No. 6, pp. 18–25, June 1954.

"Chem. Engineering," vol. 62, pp. 228, 230, 232, 234, September 1955.